United States Patent [19]

Parton

[11] Patent Number: 5,188,641
[45] Date of Patent: Feb. 23, 1993

[54] COLORED POLYMERS FROM AZO DYE MONOMERS CONTAINING OLEFINIC GROUPS

[75] Inventor: Brian Parton, Bury, England

[73] Assignee: Imperial Chemical Industries PLC, London, England

[21] Appl. No.: 819,583

[22] Filed: Jan. 9, 1992

Related U.S. Application Data

[63] Continuation of Ser. No. 428,439, Oct. 30, 1989, abandoned, which is a continuation of Ser. No. 216,402, Jul. 8, 1988, abandoned, which is a continuation of Ser. No. 870,543, Jun. 4, 1986, abandoned.

[30] Foreign Application Priority Data

Jun. 12, 1985 [GB] United Kingdom ............... 8514906

[51] Int. Cl.$^5$ .................. C09B 69/10; C08F 20/34; C08L 33/14
[52] U.S. Cl. ............................. 8/647; 8/532; 8/689; 8/690; 8/918; 8/919; 8/922; 8/637.1
[58] Field of Search ............. 8/647, 689, 690

[56] References Cited

U.S. PATENT DOCUMENTS

| | | | |
|---|---|---|---|
| 3,232,691 | 2/1966 | Wilhelm et al. | 8/647 |
| 3,557,048 | 1/1971 | Wilhelm et al. | 524/461 |
| 4,101,269 | 7/1978 | Champendis | 8/647 |
| 4,132,841 | 1/1979 | Champendis | 8/647 |
| 4,763,371 | 8/1988 | Parton | 8/647 |

FOREIGN PATENT DOCUMENTS

1098916 1/1968 United Kingdom.

Primary Examiner—A. Lionel Clingman
Attorney, Agent, or Firm—Cushman, Darby & Cushman

[57] ABSTRACT

A colored polymer containing repeat units derived from at least one azo dye which is free from water-solubilizing groups and contains at least one polymerizable olefinically unsaturated group and has the formula:

$$A-N=N-E$$

wherein A represents the residue of a carbocyclic or heterocyclic diazotisable amine containing at least one electron-withdrawing substituent and E represents the residue of a carbocyclic or heterocyclic coupling component with the proviso that when both A and E are carbocyclic, the residue of the diazotisable amine does not contain a nitro or chloro substituent except when another different electron-withdrawing substituent is also present, the or each polymerizable group being attached to a carbon atom forming part of residue A or E.

17 Claims, No Drawings

COLORED POLYMERS FROM AZO DYE MONOMERS CONTAINING OLEFINIC GROUPS

This is a continuation of Application No. 07/428,439, filed on Oct. 30, 1989, which was abandoned upon the filing hereof, which in turn is a Continuation of application Ser. No. 07/216,402, filed Jul. 8, 1988 which in turn is a Divisional of application Ser. No. 06/870,543, filed Jun. 4, 1986 both abandoned.

This invention relates to coloured polymers, to a method for their production and to their use for the coloration of various substrates.

Dyes containing vinyl, acryloyl and other polymerisable olefinic groups are already known and methods have been proposed for their homopolymerisation and for their copolymerisation with other polymerisable monomers both in the presence and absence of textile or other substrates.

Thus, United Kingdom Patent Specification No. 877402 describes the production of coloured polymers, useful as pigments, by copolymerising azo or anthraquinone dyes containing polymerisable olefinic groups with other unsaturated polymerisable compounds.

United Kingdom Patent Specification No. 914354 describes a process for the simultaneous dyeing and finishing of textiles by applying a coloured polymer which has been obtained by the emulsion copolymerisation of a dye containing a polymerisable olefinic group and an uncoloured polymerisable compound, the applied copolymer then being cross-linked.

United Kingdom Patent Specification No. 1036700 describes organic pigments obtained by the homopolymerisation of 1-methacryloylaminoanthraquinone, 1-p-vinylbenzoylaminoanthraquinone and certain derivatives thereof.

Other patents, for example United Kingdom Patents 1046751 and 1218547, have described the application of polymerisable dyes containing olefinic groups to textile materials in conjunction with a free radical polymerisation initiator with the object of polymerising the dye on or within the textile fibers.

Other references to the synthesis, properties and uses of polymeric dyes may be found in a review article by Marechal (Progress in Organic Coatings, 10 (1928) 251–287).

None of the processes described in the above documents appears to have achieved commercial importance, presumably because they did not provide colorations having the intensities and fastness properties that could be obtained more economically by other methods.

It has been found that coloured polymers useful in a wide variety of coloration processes can be obtained by polymerising appropriately substituted azo dyes containing polymerisable groups.

Accordingly, the invention provides coloured polymers containing repeat units derived from at least one azo dye which is free from water-solubilising groups and contains at least one polymerisable olefinically unsaturated group and has the formula:

$$A-N=N-E \quad (1)$$

wherein A represents the residue of a carbocyclic or heterocyclic diazotisable amine containing at least one electron-withdrawing substituent and E represents the residue of a carbocyclic or heterocyclic coupling component with the proviso that when both A and E are carbocyclic, the residue of the diazotisable amine does not contain a nitro or chlorine substituent except when another different electron-withdrawing substituent is also present, the or each polymerisable group being attached to a carbon atom forming part of residue A or E.

The polymerisable olefinically unsaturated groups present in the dyes are groups which render the dyes homopolymerisable or copolymerisable with other olefinic (vinyl) monomers under standard polymerisation conditions. As examples of such groups, there may be mentioned groups of the general formula:

(2)

wherein X represents an atom or group linking the olefinic group to a carbon atom present in residue A or residue E, n has the value 0 or 1 and each of $R^1$, $R^2$ and $R^3$ independently represents a hydrogen or halogen atom or a hydroxyl, optionally substituted alkyl, optionally substituted alkoxy, optionally substituted alkylthio, cycloalkyl, optionally substituted aryl, optionally substituted aryloxy, optionally substituted arylthio, nitro, cyano, acyloxy or alkoxycarbonyl group.

Alkyl groups mentioned herein, either as such or as components of larger groups such as alkoxycarbonyl, particularly include lower alkyl groups having one to four carbon atoms.

The preferred polymerisable groups are those in which each of $R^2$ and $R^3$ is hydrogen and $R^1$ is hydrogen, halogen, lower alkyl, cyano or alkoxycarbonyl. Especially preferred groups are those in which each of $R^2$ and $R^3$ is hydrogen and $R^1$ is hydrogen, halogen (especially chlorine) or lower alkyl (especially methyl).

As examples of linkages which may be represented by X in the formula:

(3)

there may be mentioned —O—, —S—, —CO—, —CS—, —NR⁴—CO— in which R⁴ is hydrogen or alkyl, —O—CO—, —S—CO—, —CO—O—, —CO—S—, —SO—, —SO₂—, —NR⁴—SO₂—, —SO₂—NR⁴—, —CH₂—, —O—CH₂—, —S—CH₂—, —SO₂—CH₂—, —COCH₂—, —O—CO—CH₂—, —NR⁴—CH₂— and —NR⁴—.

As examples of especially preferred polymerisable groups there may be mentioned groups of the formula:

$$-O-CO-CR^5=CH_2 \quad (4)$$

in which $R^5$ represents hydrogen or lower alkyl, especially methyl.

It is preferred that the dyes of formula (1) contain two polymerisable groups, although dyes containing only one such group and dyes containing a higher number of polymerisable groups, for example five, may be used.

The requirement that the azo dyes upon which the coloured polymers are based are free from water-solubilising groups means that they do not contain the sulphonate, carboxylate, quaternary ammonium or other ionic groups which provide dyes with substantial water-solubility.

As examples of carbocyclic radicals which may be represented by A, there may be mentioned naphthyl and, especially, phenyl radicals. Heterocyclic radicals which may be represented by A include
2-thienyl,
3- or 4-pyrazolyl,
2- or 5-imidazolyl,
3-(1,2,4-triazolyl),
5-(1,2,3,4-tetrazolyl),
2-(1,3,4-thiadiazolyl),
3- or 5-(1,2,4-thiadiazolyl),
4- or 5-(1,2,3-thiadiazolyl),
3-, 4- or 5-isothiazolyl
3-pyridyl,
2-benzoxazolyl,
3-thienyl-[2,3-b]-pyridine,
3-isothiazolyl-[3,4-d]-pyrimidine,
3-isothiazolyl-[3,4-b]-pyridine,
3-isothiazolyl-[3,4-b]-thiophene,
2-thiazolyl,
2-benzthiazolyl,
indazol-3-yl,
pyrazolopyridin-3-yl, and benz-2,1-isothiazol-3-yl radicals.

As examples of electron-withdrawing (electron-attracting) substituents which may be present on A, there may be mentioned chloro, bromo, fluoro, nitro, cyano, thiocyanato, trifluoromethyl, alkylcarbonyl (e.g. acetyl), alkylsulphonyl (e.g. methylsulphonyl), alkoxycarbonyl (e.g. methoxycarbonyl, ethoxycarbonyl), arylcarbonyl (e.g. benzoyl), arylsulphonyl (e.g. phenylsulphonyl), carbamoyl, alkylcarbamoyl (e.g. methylcarbamoyl), dialkylcarbamoyl (e.g. diethylcarbamoyl), arylcarbamoyl, diarylcarbamoyl, sulphamoyl, alkylsulphamoyl (e.g. ethylsulphamoyl), dialkylsulphamoyl (e.g. dimethylsulphamoyl), arylsulphamoyl, diarylsulphamoyl and arylazo with the aforementioned proviso that A does not carry a chloro or nitro substituent chloro and nitro are not present when both of A and E are carbocyclic unless another different electron-withdrawing substituent is also present. This means that when E is carbocyclic, A cannot be the residue of, for example, 2-chloraniline, 4-nitroaniline or 2,4-dinitroaniline but it can be the residue of, for example, 2-cyano-4-nitroaniline, 2-chloro-4-nitroaniline or 4-chloro-2,6-dicyanoaniline.

In addition to carrying one or more electron-withdrawing substituent, the residue represented by A may carry one or more non-ionic substituents which are not electron-withdrawing in character. Examples of such substituents include hydroxy, alkyl (e.g. methyl, butyl), alkoxy (e.g. methoxy) and acylamino (e.g. acetylamino) radicals.

The residue of the coupling component represented by E may be the residue of any of the carbocyclic or heterocyclic coupling components, that is to say compounds which couple with diazo compounds to form azo dyes. Examples of such coupling components include members of the phenol, naphthol, arylamine, pyrazolone, aminopyrazole, 2,6-diaminopyridine, 2,6-dihydroxypyridine and aminopyrimidine series. Any of the non-ionic substituents appropriate to coupling components may be present.

One class of azo dyes from which the coloured polymers of the invention may be derived may be represented by the formula:

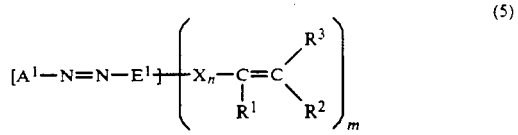

(5)

wherein $A^1$ represents the residue of a carbocyclic diazotisable amine containing at least one electron-withdrawing substituent which is not nitro or chlorine except when another different electron-withdrawing substituent is also present and optionally one or more non-ionic substituent not electron-withdrawing in character;

$E^1$ represents the residue of a carbocyclic coupling component;

m is an integer of at least 1, and $R^1$, $R^2$, $R^3$, X and n have the meanings given above, the dyes being free from water-solubilising groups.

A second class of azo dyes from which the coloured polymers of the invention may be derived may be represented by the formula:

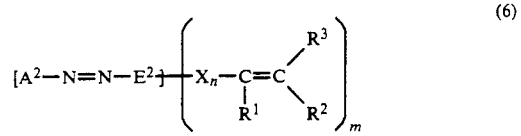

(6)

wherein $A^2$ represents the residue of a carbocyclic diazotisable amine containing at least one electron-withdrawing substituent and optionally one or more non-ionic substituent not electron-withdrawing in character;

$E^2$ represents the residue of a heterocyclic coupling component; and $R^1$, $R^2$, $R^3$, X, n and m have the meanings given above, the dyes being free from water-solubilising groups.

A third class of azo dyes from which the coloured polymers of the invention may be derived may be represented by the formula:

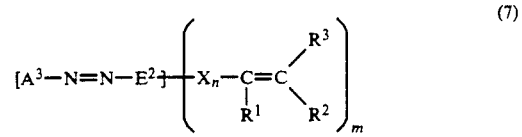

(7)

wherein $A^3$ represents the residue of a heterocyclic diazotisable amine containing at least one electron-withdrawing substituent and optionally one or more non-ionic substituent not electron-withdrawing in character; and $E^2$, $R^1$, $R^2$, $R^3$, X, n and m have the meanings given above, the dyes being free from water-solubilising groups.

A fourth class of azo dyes from which the coloured polymers of the invention may be derived may be represented by the formula:

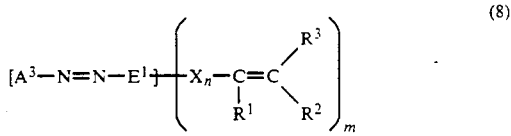

(8)

wherein $A^3$, $E^1$, $R^1$, $R^2$, $R^3$, X, n and m have the meanings given above the dyes being free from water-solubilising groups.

Preferred dyes include the dyes of formula (6) and those dyes of formula (8) in which the electron-withdrawing substituent carried by $A^3$ is other than nitro.

The polymers may be prepared by polymerising at least one azo dye of formula (1) which is free from water-solubilising groups and contains at least one polymerisable olefinically unsaturated group. The polymerisation may be carried out using any of the appropriate conventional methods. Thus, bulk, solution, emulsion or suspension techniques may be used with the usual polymerisation initiators and, where necessary, emulsifiers and/or protective colloids. To obtain the polymers in solid particulate form, it is convenient to carry out the polymerisation in an organic solvent using a suitably soluble initiator such as azodiisobutyronitrile and isolate the polymer by precipitation and filtration. Polymers can be obtained in a convenient stable dispersion (latex) form using emulsion polymerisation techniques and, for example, a persulphate as initiator.

Especially useful coloured polymers of the invention may be prepared by copolymerising at least one azo dye of formula (1) which is free from water-solubilising groups and contains at least one polymerisable olefinically unsaturated group and at least one uncoloured polymerisable olefin. The copolymerisation may be carried out using the conventional methods described above to give copolymers containing repeat units derived from the azo dye and from the uncoloured olefin. The copolymers suitably contain at least 0.5% and preferably from 2 to 10% on a weight basis of units derived from the azo dye.

Examples of uncoloured polymerisable olefins which may be used in preparing the coloured polymers of the invention include vinyl aromatic compounds, for example, styrene, alpha-methylstryene and vinyl toluene, alpha-beta-unsaturated carboxylic acids, for example acrylic and methacrylic acids and the nitriles, amides and esters thereof, for example, acrylonitrile, methyl methacrylate, butyl methacrylate, glycidyl methacrylate, acrylamide and N-methylolacrylamide, vinyl esters, for example vinyl acetate, vinyl chloride, vinylidene chloride, vinyl carbazole and vinyl ketones. Methacrylic acid esters such as methyl methacrylate are preferred.

Azo dyes of formula (1) which are free from water-solubilising groups and contain at least one polymerisable olefinically unsaturated group are known in the art and may be prepared by introducing one or more polymerisable groups into an azo dye or into one or more of the intermediates therefor, for example the diazotisable amine and/or the coupling component. In one method of introduction, a dye or intermediate containing an appropriate functional group is reacted with a compound containing a polymerisable olefinic group and a functional group which is reactive towards the aforementioned functional group. Any azo dyes of formula (1) which are free from water-solubilising groups and contain at least one polymerisable olefinic group and which have not been specifically described in the prior art may be obtained by the conventional techniques employed in azo dye chemistry. These will present no difficulty to the skilled person and involve the usual substitution, diazotisation and coupling reactions and standard isolation techniques.

The coloured polymers are particularly useful in the form of latices containing from 20 to 50% by weight of the polymer. An especially useful latex contains from 20 to 50% by weight of a copolymer containing from 2 to 10%, by weight of units derived from a dye of formula (1) having at least two methacryloyl groups and from 98 to 90% by weight of units derived from a mixture of co-monomers consisting of methyl methacrylate and an N-methylolacrylamide derivative which latter comprises from 0.1 to 5%, preferably from 0.5 to 2.0%, by weight of the co-monomer mixture. The dye preferably contains two methacryloyloxy groups and the N-methylolacrylamide derivative is preferably N-methylolacrylamide itself.

The coloured polymers of the invention are useful in a wide variety of coloration processes for colouring textile materials, plastics materials, paper, paints and lacquers, the polymers being used, for example, in the form of latices, fine powder dispersions, liquid solutions or powders. The polymers are particularly valuable for colouring cellulosic textile materials, for example cotton, aromatic polyester fibres, for example polyethylene terephthalate and cotton/polyester blends. When so used, the polymers exhibit brighter shades and higher light fastness than the coloured polymers described in the prior art. For textile printing processes, the polymers of the invention can be obtained in the form of emulsions which are superior in stability to dispersions of the pigments commonly used in textile printing. Furthermore, the copolymer systems are superior to pigment systems in tinctorial value, in fastness to rubbing, to solvents and in transparency where necessary.

The invention is illustrated but not limited by the following Examples in which all parts are by weight.

EXAMPLE 1

1.0 part of 4,6-bis-(beta-acryloyloxyethylamino)-2-ethyl-5-(4-nitrophenylazo)pyrimidine is dissolved in 50 parts of methyl methacrylate then added with rapid stirring to a solution of 1.2 parts of the sodium salt of lauryl ether sulphonic acid and 0.4 parts of an ethoxylated $C_{13}$–$C_{15}$ aliphatic alcohol in 20 parts of water to give a coarse emulsion. This coarse emulsion is treated with 4.6 parts of 4% aqueous potassium persulphate then added portionwise over 15 minutes to a solution of 3.5 parts of 4% aqueous potassium persulphate and 0.3 parts of the sodium salt of lauryl ether sulphonate in 33 parts of water at 88°–90° C. After stirring at 88°–90° C. for a further 10 minutes the mixture is cooled to room temperature, screened then applied to polyester and cotton using conventional printing and continuous dyeing techniques to yield a golden yellow shade of excellent fastness to light, heat and wet treatments. When applied to cotton in the presence of a butyl acrylate based polymeric binder system excellent fastness to wet and dry rubbing is also obtained.

The following table gives further Examples of products obtained in a similar way to the product of Example 1. Column 2 indicates the dyestuff monomer used, Column 3 the colourless co-monomer and Column 4 the colour of the final print.

| Example | Dyestuff Monomer | Colourless Co-Monomer | Shade on Cotton |
|---|---|---|---|
| 2 | [structure: 4-nitrophenyl-azo pyrimidine with two NHCH$_2$CH$_2$OCO.C(CH$_3$)=CH$_2$ groups and C$_2$H$_5$] | Methyl methacrylate | Golden yellow |
| 3 | [structure: 4-nitrophenyl-azo pyrimidine with two NHCH$_2$CH$_2$OCO.C(CH$_3$)=CH$_2$ groups and C$_2$H$_5$] | Ethyl methacrylate | " |
| 4 | [structure: 3-methyl-4-cyano-isothiazole azo coupled to 3-methyl-4-N(CH$_2$CH$_2$OCOCH=CH$_2$)$_2$ phenyl] | Methyl methacrylate | Bluish- |
| 5 | [structure: pyrazole with CH$_2$CN, CN, N-CH$_3$ azo coupled to 3-methyl-4-N(CH$_2$CH$_2$OCOCH=CH$_2$)$_2$ phenyl] | Methyl methacrylate | Orange |
| 6 | [structure: 3-methyl-4-cyano-5-(thiophene-2-carbonitrile) azo coupled to 3-methyl-4-N(CH$_2$CH$_2$OCOCH=CH$_2$)$_2$ phenyl] | " | Violet |
| 7 | [structure: dicyano-imidazole with N-CH$_3$ azo coupled to 3-methyl-4-N(CH$_2$CH$_2$OCOC(CH$_3$)=CH$_2$)$_2$ phenyl] | Methyl methacrylate | Bluish-red |
| 8 | [structure: 2-chloro-4,6-dicyanophenyl azo coupled to 3-methyl-4-N(CH$_2$CH$_2$OCOCH=CH$_2$)$_2$ phenyl] | " | Orange |
| 9 | [structure: 3,5-dimethyl-2,6-dicyanophenyl azo coupled to 3-methyl-4-N(CH$_2$CH$_2$OCOCH=CH$_2$)$_2$ phenyl] | Methyl methacrylate | Reddish-orange |

| Example | Dyestuff Monomer | Colourless Co-Monomer | Shade on Cotton |
|---|---|---|---|
| 10 | 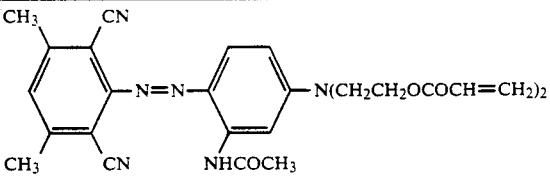 | " | Bluish-red |
| 11 | 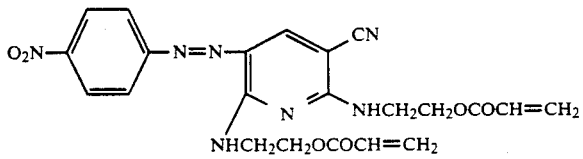 | Methyl methacrylate | Orange |

Table 2 describes further Examples of coloured copolymers prepared by the method of Example 1. In the table, the second and third columns respectively describe the diazo and coupling components used to make the azo dye. The third column gives the colourless co-monomer and the final column indicates the colour of the printed cotton.

TABLE 2

| Example | Diazo Component | Coupling Component | Colourless co-monomer | Shade on cotton |
|---|---|---|---|---|
| 12 | 4-nitroaniline | 4,6-bis-[(2-acryloyloxy-1-ethyl)ethylamino]-2-ethylpyrimidine. | methyl methacrylate (mm) | Golden yellow |
| 13 | 4-nitroaniline | 4,6-bis-[(2-acryloyloxy-1-ethyl)ethylamino]-2-ethylpyrimidine. | mm/acrylic acid | Golden yellow |
| 14 | 4-nitroaniline | 4,6-bis[(2-acryloyloxy-1-ethyl)ethylamino]-2-ethylpyrimidine. | mm/butyl acrylate | Golden yellow |
| 15 | 4-nitroaniline | 4,6-bis-[(2-acryloyloxy-1-ethyl)ethylamino]-2-ethylpyrimidine. | 2-ethyl hexyl methacrylate | Golden yellow |
| 16 | 4-nitroaniline | 4,6-bis-[(2-acryloyloxy-1-ethyl)ethylamino]-2-ethylpyrimidine. | dodecyl methacrylate | Golden yellow |
| 17 | 4-cyanoaniline | 4-acryloyloxyethylamino-6-ethyl-amino-2-ethylpyrimidine | mm | Mid-yellow |
| 18 | 4-cyanoaniline | 4-acryloyloxy-ethylamino-6-ethylamino-2-ethylpyrimidine | mm/1,2-bis-acryloyl oxyethane | Mid-yellow |
| 19 | 4-(1,1-bis-acryloyloxy-methylpropoxycarbonyl)aniline | 1-ethyl-5-cyano-4-methyl-6-hydroxy-pyrid-2-one | mm | Greenish yellow |
| 20 | 3,4-dicyanoaniline | 3-methyl-N,N-bis-acryloyloxyethyl-aniline | mm | Orange |
| 21 | 3,4-dicyanoaniline | 3-methyl-N-acryloyloxyethyl-N-ethylaniline | mm | Orange |
| 22 | 2-cyano-4-nitroaniline | 3-methyl-N,N-bis-acryloyloxyethyl-aniline | mm | Bluish red |
| 23 | 2-chloro-4-nitroaniline | 3-methyl-N,N-bis-acryloyloxyethyl-aniline | mm | Red |
| 24 | 4-chloro-2,6-dicyanoaniline | 3-methyl-N,N-bis-acryloyloxyethyl-aniline | mm | Red |
| 25 | 2,6-dicyano-4-methylaniline | 3-methyl-N,N-bis-acryloyloxyethyl-aniline | mm | Red |
| 26 | 4-chloro-2-nitroaniline | 3-methyl-N,N-bis-acryloyloxyethyl-aniline | mm | Red |
| 27 | 2-chloro-6-cyano-4-nitroaniline | 3-acetylamino-N,N-bis-acryloyl-oxyethylaniline | mm | Blue |
| 28 | 2-chloro-4-nitro-aniline | N,N-bis-acryloyloxyethylaniline | mm | Orange |
| 29 | 4-(N,N-bis-2-acryloyloxy-ethylsulphamoyl)-2-nitro-aniline | 2-naphthol | mm | Orange |
| 30 | 4-(N,N-bis-2-acryloyloxy-ethylsulphamoyl)-2,6-dichloro-aniline | N,N-bis-acryloyloxyethylaniline | mm | Golden yellow |
| 31 | 2,3,5-trichloro 6-cyanoaniline | 3-methyl-N,N-bis-acryloyloxyethyl-aniline | mm | Orange |
| 32 | 5-amino-4-cyano-1,3-dimethyl pyrazole | N-acryloyloxyethyl-N-cyanoethyl-3-acrylamidoaniline | mm | Golden yellow |
| 33 | 3-chloro-4-cyano-aniline | 3-methyl-N,N-bis acryloyloxyethylaniline | mm | Orange |
| 34 | 4-aminoazobenzene | 3-methyl-N,N-bis acryloyloxyethylaniline | mm | Orange |
| 35 | 3,5-dicyanoaniline | 3-methyl-N,N-bis | mm | Orange |

TABLE 2-continued

| Example | Diazo Component | Coupling Component | Colourless co-monomer | Shade on cotton |
|---|---|---|---|---|
| | | acryloyloxyethylaniline | | |

The following Table 3 represents polymerised dye emulsions obtained in a similar fashion by using the coupling component of Example 35 and the diazo component described in the second column. The colourless co-monomer is again described in column three and the shade imparted to cotton is shown in the final column.

Similar dyes are prepared by using the coupling component of Example 1 with the diazo components indicated in Table 4. The shades obtained on cotton are indicated in the final column of the table. All of the co-polymerised dyes are made using the quantities described in Example 1.

TABLE 3

| Example | Diazo Component | Colourless co-monomer | Shade on cotton |
|---|---|---|---|
| 36 | 2,5-dichloro-4-cyanoaniline | mm | Orange |
| 37 | 2,6-dicyano-4-ethoxycarbonyl-3-methyl-aniline | mm | Bluish red |
| 38 | 3-amino-5-cyano-6-methylisothiazole[3,4:b]pyridine | mm | Blue |
| 39 | 2-amino-6-thiocyanatobenzthiazole | mm | Red |
| 40 | 2-amino-5-chloro-1,3-thiadiazole | mm | Scarlet |
| 41 | 4-ethylsulphamoylaniline | mm | Golden yellow |
| 42 | 4-methoxycarbonylaniline | mm | Golden yellow |
| 43 | 4-butoxycarbonylaniline | mm | Golden yellow |
| 44 | 4-methylsulphonylaniline | mm | Orange |
| 45 | 2-cyano-4-methoxycarbonylaniline | mm | Red |
| 46 | 2-chloro-6-cyano-4-methoxycarbonyl-aniline | mm | Red |
| 47 | 2,6-dicyano-4-methoxycarbonylaniline | mm | Violet |
| 48 | 2-amino-3-cyano-5-phenylazothiophene | mm | Blue |
| 49 | 2-chloro-5-nitroaniline | mm | Yellow |
| 50 | 4-bromo-2,6-dicyanoaniline | mm | Red |
| 51 | 2-amino-3-cyano-4-ethoxycarbonylaniline | mm | Red |
| 52 | 5-amino-3-cyanomethyl-4-ethoxycarbonyl-1-methylpyrazole | mm | Orange |
| 53 | 5-amino-3-phenyl-1,2,4-thiadiazole | mm | Red |
| 54 | 5-amino-3-methylthio-1,2,4-thiadiazole | mm | Red |
| 55 | 5-amino-4-nitro-3-methylisothiazole | mm | Reddish blue |
| 56 | 5-amino-3-bromo-4-acetylisothiazole | mm | Red |
| 57 | 6-amino-2-methylthioisothiazolo[4,5:d]thiazole | mm | Red |
| 58 | 3-amino-4-methyl-5-methylthioisothiazole | mm | Golden yellow |
| 59 | 4-amino-3,5-bis-ethoxycarbonylisothiazole | mm | Scarlet |
| 60 | 2-amino-4-chloro-5-formylthiazole | mm | Violet |
| 61 | 5-amino-4-cyano-3-methylsulphonyliso-thiazole | mm | Bluish red |
| 62 | 5-amino-4-cyano-3-ethylsulphonyliso-thiazole | mm | Bluish red |
| 63 | 3-amino-2,4,6-trichloropyridine | mm | Orange |
| 64 | 2-amino-4,5-dicyanothiazole | mm | Reddish blue |
| 65 | 2-amino-6-cyanobenzthiazole | mm | Bluish red |
| 66 | 3-amino-5,7-dicyano-2,1-benzisothiazole | mm | Blue |
| 67 | 2-cyano-3,5-bistrifluoromethylaniline | mm | Red |

TABLE 4

| Example | Diazo Component | Colourless co-monomer | Shade on cotton |
|---|---|---|---|
| 68 | 2-chloro-4-nitroaniline | mm | Orange |
| 69 | 2-cyano-4-nitroaniline | mm | Reddish orange |
| 70 | 2-bromo-6-cyano-4-nitroaniline | mm | Yellow red |
| 71 | 2,6-dicyano-4-nitroaniline | mm | Scarlet |
| 72 | 4-ethylsulphamoylaniline | mm | Yellow |
| 73 | 3,4-dicyanoaniline | mm | Golden yellow |
| 74 | 4-nitroaniline | mm/N-methylol acrylamide | Golden yellow |
| 75 | 2-chloro-5-nitroaniline | mm | Yellow |
| 76 | 4-methoxycarbonylaniline | mm | Mid-yellow |
| 77 | 2,6-dichloro-4-ethylsulphamoylaniline | mm | Yellow |
| 78 | 2-bromo-6-cyano-4-methoxycarbonyl-aniline | mm | Orange |
| 79 | 5-amino-4-cyano-3-methylisothiazole | mm | Scarlet |
| 80 | 4-methylsulphonylaniline | mm | Yellow |
| 81 | 2-amino-3-cyano-5-phenylazothiophene | mm | Scarlet |
| 82 | 2,6-dicyano-4-methylaniline | mm | Orange |
| 83 | 2,6-dicyano-4-methoxycarbonylaniline | mm | Scarlet |

TABLE 4-continued

| Example | Diazo Component | Colourless co-monomer | Shade on cotton |
|---|---|---|---|
| 84 | 2-cyano-5-nitroaniline | mm | Scarlet |
| 85 | 2-methoxycarbonyl-4-nitroaniline | mm | Scarlet |

EXAMPLE 86

A preparation is conducted in exactly the same way as in Example 1 except that 3.0 parts of the same dyestuff monomer is used in place of the 1.0 part of Example 1 to give a final print on cotton with good handle properties.

EXAMPLE 87

A further preparation is conducted as described in Example 86 except that 1 part of N-methylol acrylamide is additionally dissolved in the solution containing the surfactants (lauryl ether sulphonate and ethoxylated $C_{13}$–$C_{15}$ aliphatic alcohol). The final emulsion is applied to cotton in the presence of synthetic thickener alone and fixed by baking at 150°. The resultant print has good handle properties and fastness to scrubbing and rubbing.

Further examples are illustrated in the following Table 5. The diazo component is shown in the second column, the coupling component in the third column, the co-monomer in the fourth column and the shade imparted to cotton in the fifth column. The method of preparation is as described for Example 1.

TABLE 5

| Example | Diazo Component | Coupling Component | Colourless co-monomer | Shade on cotton |
|---|---|---|---|---|
| 88 | 2-chloro-4-nitroaniline | 1-[2,3-bis(acryloyl oxy)prop-1-yl]-3-cyano-2-hydroxy-4-methylpyrid-6-one | mm | Greenish yellow |
| 89 | " | 1-[4-N:N-bis(2-acryloyloxyethyl)sulphamoyl]phenyl-5-hydroxy-4-methyl pyrazole | mm | " |
| 90 | " | 2-(N,N-bis-2-acryloyloxyethyl)-carbamoyl-3-naphthol | mm | Scarlet |
| 91 | " | 4,6-bis-(2-acryloyloxyethyl-amino)-2-chloro-pyrimidine | mm | Golden yellow |
| 92 | " | 2,4,6-tris(2-acryloyloxyethyl-amino)-2-chloro-pyrimidine | mm | Orange |
| 93 | " | 4,6-bis(2-acryloyloxyethyl-amino)-2-thiomethyl pyrimidine | mm | " |
| 94 | " | 4,6-bis(2-acryloyloxyethyl-amino)-2-N,N-bis-ethylamino pyrimidine | mm | Scarlet |
| 95 | 2-chloro-4-nitroaniline | 5-(2,3-bis-acryloyloxy)prop-1-ylamino-1,3-dimethylpyrazole | mm | Golden yellow |
| 96 | " | 2,6-bis(2-acryloyloxyethyl-amino)-3-cyano-4-methylpyridine | mm | Orange |
| 97 | " | 3-[N,N-bis(2-cyanoethyl)amino]-N-acryloylaniline | mm | " |
| 98 | " | 2-chloro-N-(2,3-bis-acryloyloxy-prop-1-yl)aniline | mm | Golden yellow |
| 99 | " | 2-chloro-N-(2,3-bis-acryloyloxy-prop-1-yl)aniline | mm | " |
| 100 | 4-nitroaniline | 2,4-bis-(2-acryloyloxyethyl-amino)-4-chloro-pyrimidine | mm | " |
| 101 | " | 2,4,6-tris-(2-acryloyloxyethyl-amino)-pyrimidine | mm | " |
| 102 | " | 2,6-bis(2-acryloyloxyethyl-amino)-3-cyano- | mm | Orange |

TABLE 5-continued

| Example | Diazo Component | Coupling Component | Colourless co-monomer | Shade on cotton |
|---|---|---|---|---|
| 103 | 4-nitroaniline | 4-methylpyridine 1-[2,3-bis(acryloyl oxy)prop-1-yl]-3-cyano-2-hydroxy-4-methylpyrid-6-one | mm | Greenish yellow |
| 104 | 4-(N,N-bis-2-acryloyloxyethyl)sulphamoyl-2-chloroaniline | N,N,N'-tris(2-acryloyloxyethyl)-1,3-phenylene diamine | mm | Scarlet |
| 105 | 4-(N,N-bis-2-acryloyloxyethyl)sulphamoyl-2-chloroaniline | 5-acryloylamino-2-methoxyl-N,N-bis-2-acryloyloxy-ethylaniline | mm | Red |
| 106 | 4-(N,N-bis-2-acryloyloxyethyl)sulphamoyl-2-chloroaniline | N-(2-acryloyloxy-ethyl)-N-(2-cyano-ethyl)-3-methyl-aniline | mm/bis-acryloyl ethylene glycol | Orange |
| 107 | 4-aminostyrene | 1-(3-acryloyloxy-n-propyl)-3-cyano-2-hydroxy-4-methyl-pyrid-6-one | mm/bis-acryloyl ethylene glycol | Greenish yellow |
| 108 | 4-acryloyloxy-ethylamino sulphonylaniline | 1-(3-acryloyloxy-n-propyl)-3-cyano-2-hydroxy-4-methyl-pyrid-6-one | mm/bis-acryloyl ethylene glycol | " |
| 109 | 2-chloro-4-nitroaniline | N,N-bis-(2-acryloyloxyethyl) aniline | butyl methacrylate | Orange |
| 110 | " | 4,6-bis-(2-methacryloyloxy-ethylamino)-2-ethylpyrimidine | 2-ethyl hexyl methacrylate/ mm. 2/1 | " |
| 111 | " | 4,6-bis-(2-methacryloyloxy-ethylamino)-2-ethylpyrimidine | Styrene/ mm. 1/3 | " |
| 112 | " | 4,6-bis-(2-methacryloyloxy-ethylamino)-2-ethylpyrimidine | alpha-methyl styrene | " |
| 113 | " | 4,6-bis-(2-methacryloyloxy-ethylamino)-2-ethylpyrimidine | methacrylo-nitrile | " |
| 114 | 2-chloro-4-nitroaniline | 4,6-bis-(2-methacryloyloxy-ethylamino)-2-ethylpyrimidine | mm/ glycidyl methacrylate 4/1 | " |
| 115 | " | 4,6-bis-(2-methacryloyloxy-ethylamino)-2-ethylpyrimidine | vinyl acetate/ mm. 1/2 | " |
| 116 | " | 4,6-bis-(2-methacryloyloxy-ethylamino)-2-ethylpyrimidine | dodecyl methacrylate | " |
| 117 | 4-nitroaniline | 4,6-bis-(2-acryloyloxyethyl-amino)-2-ethyl-pyrimidine | mm | " |
| 118 | " | 4,6-bis-(2-methacryloyloxy-ethylamino)-2-ethylpyrimidine | mm | " |
| 119 | 2-cyano-4-nitroaniline | N,N-bis-[2-(2-carboxyacryloyl-oxy)ethyl]-3-methylaniline | mm | Bluish red |
| 120 | 4-nitroaniline | 4,6-bis-[2-(1-bromoacryloyl-oxy)ethylamino]-2-ethylpyrimidine | mm | Golden yellow |
| 121 | " | 4,6-bis-[2-(1-methoxyacryloyl-oxy)ethylamino]-2-ethylpyrimidine | mm | " |

EXAMPLE 122

10 parts of the product from Example 1 are added to 50 parts of an emulsion paint base containing titanium dioxide pigment giving a strong golden-yellow shade. A dried film of this material has good fastness to light. The coloured emulsion paint obtained is stable and the coloured polymer deposits much less quickly than does a pigment control.

EXAMPLE 123

1.0 part of the dyestuff monomer of Example 117 is stirred with 30 parts of methyl ethyl ketone and 6.0 parts of methyl methacrylate under nitrogen for 10 minutes until a solution is obtained. Azo-bis-isobutyronitrile (0.4 parts) is added and the mixture stirred and heated under reflux whilst passing nitrogen gas for 2 hours. The product solution is added to methanol and the oil which precipitates slowly becomes a gum from which the supernatant liquor is decanted. The gum is triturated with methanol and the solid which forms is filtered off and washed well with methanol then dried at 60° to give an orange powder soluble in ethyl acetate. This powder colours polymers such as methyl methacrylate in transparent golden yellow shades of excellent fastness to light and bleeding or blooming.

EXAMPLE 124

The emulsion product of Example 1 is diluted with 200 parts of water and is used in aqueous based inks to produce prints of excellent fastness to water, light and rubbing.

EXAMPLE 125

2 parts of the product from Example 123 is gravel milled with 8 parts of water and 1 part of dispersing agent for 48 hours to give a dispersion which is applied from a printing paste containing a polyacrylic acid synthetic thickener to cotton, then fixed by baking at 150° for 2 minutes. The resultant golden yellow print has good fastness to washing.

EXAMPLE 126

A preparation is conducted as described in Example 123 except that the dyestuff monomer of Example 17 is replaced by the dyestuff monomer of Example 1. The product gives prints with excellent fastness to washing, solvents and rubbing after application with a polyacrylate binder.

I claim:

1. A coloured polymer obtained by the co-polymerisation of at least one uncoloured polymerisable olefin and at least one azo dye which is free from water-solubilising groups and contains at least one polymerisable olefinically unsaturated group and has the formula:

wherein:
A represents the residue of a carbocyclic diazotisable amine containing at least one electron-withdrawing substituent; and
E represents the residue of a heterocyclic coupling component of the aminopyrazole, 2,6-diaminopyridine, 2,6-dihydroxypyridine or aminopyrimidine series; or
A represents the residue of a heterocyclic diazotisable amine containing at least one electron-withdrawing substituent; and
E represents the residue of a heterocyclic coupling component of the aminopyrazole, 2,6-diaminopyridine, 2,6-dihydroxypyridine or aminopyrimidine series; or
A represents the residue of a heterocyclic diazotisable amine containing at least one electron-withdrawing substituent; and
E represents the residue of a carbocyclic coupling component, the or each polymerisable group being attached to a carbon atom forming part of residue A or E.

2. A coloured polymer according to claim 1 wherein the azo dye of the formula A—N=N—E is:
2-ethyl-4,6-bis(2-methacryloyloxyethylamino)-5-(4-nitrophenylazo)pyrimidine; N,N-bis(2-acryloyloxyethyl)amino-3-methyl-4-(4-cyano-3-methylisothiazol-5-ylazo)benzene;
N,N-bis(2-acryloyloxyethyl)amino-3-methyl-4-[4-cyano-3-(cyanomethyl)-1-methylpyrazol-5-ylazo]-benzene;
N,N-bis(2-acryloyloxyethyl)amino-3-methyl-4-(3,5-dicyano-4-methylthiophene-2-ylazo)benzene; and
N,N-bis(2-methacryloyloxyethyl)amino-3-methyl-4-(4,5-dicyano-1-methylimidazol-2-ylazo)benzene.

3. A coloured polymer according to claim 1 wherein:
A represents 4-(1,1-bisacryloxymethylpropoxycarbonyl)aniline and E represents 1-ethyl-5-cyano-4-methyl-5-hydroxypyrid-2-one;
A represents 2-chloro-4-nitroaniline and E represents 1-[2,3-bis(acryloyloxy) prop-1-yl)-3-cyano-2-hydroxy-4-methylpyrid-6-one;
A represents 2-chloro-4-nitroaniline and E represents 2,4,6-tris (2-acryloyloxyethylamino)-2-chloropyrimidine;
A represents 2-chloro-4-nitroaniline and E represents 4,6-bis(2-acryloyloxy ethylamino)-2-thiomethylpyrimidine;
A represents 2-chloro-4-nitroaniline and E represents 4,6-bis(2-acryloyloxy ethylamino)-2-N,N-bisethylaminopyrimidine;
A represents 2-chloro-4-nitroaniline and E represents 5-(2,3-bis-acryloyloxy) prop-1-ylamino-1,3-dimethylpyrazole;
A represents 2-chloro-4-nitroaniline and E represents 2,6-bis(2-acryloyloxy ethylamino)-3-cyano-4-methylpyridine;
A represents 4-nitroaniline and E represents 2,4-bis-(2-acryloyloxyethyl amino)-4-chloropyrimidine;
A represents 4-nitroaniline and E represents 2,4,6-tris-(2-acryloyloxyethyl amino)-pyrimidine;
A represents 4-nitroaniline and E represents 2,6-bis(2-acryloyloxyethyl amino)-3-cyano-4-methylpyridine;
A represents 4-nitroaniline and E represents 1-[2,3-bis(acryloyloxy)propy-1-yl]-3-cyano-2-hydroxy-4-methylpyrid-6-one;
A represents 4-aminostyrene and E represents 1-(3-acryloyloxy-n-propyl)-3-cyano-2-hydroxy-4-methylpyrid-6-one;
A represents 4-acryloyloxyethylaminosulphonylaniline and E represents 1-(3-acryloyloxy-n-propyl)-3-cyano-2-hydroxy-4-methylpyrid-6-one;
A represents 2-chloro-4-nitroaniline and E represent 4,6-bis-(2-methacryloyl oxyethylamino)-2-ethylpyrimidine;

A represents 4-nitroaniline and E represents 4,6-bis-(2-acryloyloxyethyl amino)-2-ethylpyrimidine;

A represents 4-nitroaniline and E represents 4,6-bis-(2-methacryloyloxyethyl amino)-2-ethylpyrimidine;

A represents 4-nitroaniline and E represents 4,6-bis-[2-(1-bromoacryloyloxy) ethylamino]-2-ethylpyrimidine;

A represents 4-nitroaniline and E represents 4,6-bis-(2-(1-methoxyacryloyl oxy)ethylamino]-2-ethylpyrimidine.

4. A coloured polymer according to claim 1 wherein the or each polymerisable olefinically unsaturated group has the formula:

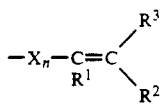

wherein X represents an atom or group linking the olefinic group to a carbon atom present in residue A or residue E, n has the value 0 or 1 and each of $R^1$, $R^2$ and $R^3$ independently represents a hydrogen or halogen atom or a hydroxyl, optionally substituted alkyl, optionally substituted alkoxy, optionally substituted alkylthio, cycloalkyl, optionally substituted aryl, optionally substituted aryloxy, optionally substituted arylthio, nitro, cyano, acyloxy or alkoxycarbonyl group.

5. A coloured polymer according to claim 4 wherein each of $R^2$ and $R^3$ is hydrogen and $R^1$ is hydrogen, halogen, lower alkyl, cyano or alkoxycarbonyl.

6. A coloured polymer according to claim 5 wherein $R^1$ is methyl.

7. A coloured polymer according to claim 4 wherein the or each polymerisable group has the formula:

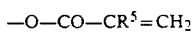

wherein $R^5$ is hydrogen or lower alkyl.

8. A coloured polymer according to claim 3 wherein $R^5$ is methyl.

9. A coloured polymer according to claim 1 wherein the azo dye contains two polymerisable olefinically unsaturated groups.

10. A coloured polymer according to claim 4 wherein the azo dye has the formula:

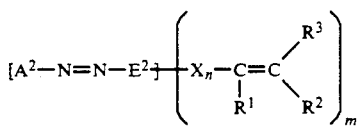

wherein $A^2$ represents the residue of a carbocyclic diazotisable amine containing at least one electron-withdrawing substituent and optionally one or more non-ionic substituent not electron-withdrawing in character;

$E^2$ represents the residue of a heterocyclic coupling component;

m is an integer of at least 1; and $R^1$, $R^2$, $R^3$, X, and n have the meanings given in claim 2, the dye being free from water-solubilising groups.

11. A coloured polymer according to claim 4 wherein the azo dye has the formula:

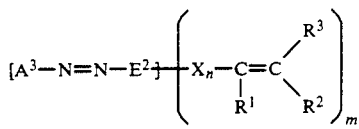

wherein $A^3$ represents the residue of a heterocyclic diazotisable amine containing at least one electron-withdrawing substituent and optionally one or more non-ionic substituent not electron-withdrawing in character;

$E^2$ represents the residue of a heterocyclic coupling component;

m is an integer of at least 1, and $R^1$, $R^2$, $R^3$, X, and n have the meanings given in claim 4, the dye being free from water-solubilising groups.

12. A coloured polymer according to claim 4 wherein the azo dye has the formula:

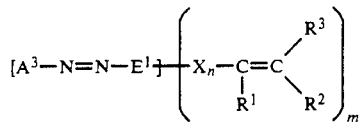

wherein $A^3$ represents the residue of a heterocyclic diazotisable amine containing at least one electron-withdrawing substituent and optionally one or more non-ionic substituent not electron-withdrawing in character;

$E^1$ represents the residue of a carbocyclic coupling component;

m is an integer of at least 1, and $R^1$, $R^2$, $R^3$, X, and n have the meanings given in claim 2, the dye being free from water-solubilising groups.

13. A coloured polymer according to claim 1 which contains repeat units derived from at least one azo dye as defined in claim 1 and from at least one uncoloured polymerisable olefin.

14. A coloured co-polymer according to claim 13 containing from 2 to 10% by weight of units derived from an azo dye.

15. A coloured co-polymer according to claim 12 wherein the uncoloured polymerisable olefin is methyl methacrylate.

16. An aqueous dispersion or latex containing from 20 to 50% by weight of the coloured polymer defined in claim 1.

17. An aqueous dispersion or latex according to claim 16 wherein the coloured polymer contains (a) from 2 to 10% by weight of units derived from at least one azo dye as defined in claim 1 having at least two methacryloyl groups, and (b) from 98 to 90% by weight of units derived from a mixture of co-monomers containing from 99.9 to 95% by weight of methyl methacrylate and from 0.1 to 5% by weight of an N-methylolacrylamide derivative.

* * * * *